United States Patent
Maekawa et al.

(10) Patent No.: US 11,300,951 B2
(45) Date of Patent: Apr. 12, 2022

(54) INPUT MODULE OF INDUSTRIAL CONTROL APPARATUS

(71) Applicant: DENSO WAVE INCORPORATED, Aichi-pref. (JP)

(72) Inventors: Takaaki Maekawa, Chita-gun (JP); Takashi Hanai, Chita-gun (JP)

(73) Assignee: DENSO WAVE INCORPORATED, Aichi-Pref. (JP)

( * ) Notice: Subject to any disclaimer, the term of this patent is extended or adjusted under 35 U.S.C. 154(b) by 89 days.

(21) Appl. No.: 16/935,260

(22) Filed: Jul. 22, 2020

(65) Prior Publication Data

US 2021/0034045 A1 Feb. 4, 2021

(30) Foreign Application Priority Data

Jul. 29, 2019 (JP) .............................. JP2019-138794

(51) Int. Cl.
*G05B 23/02* (2006.01)
*H04L 12/40* (2006.01)

(52) U.S. Cl.
CPC .... *G05B 23/0221* (2013.01); *H04L 12/40039* (2013.01)

(58) Field of Classification Search
CPC ............ G05B 23/0221; G05B 19/0425; H04L 12/40039
See application file for complete search history.

(56) References Cited

U.S. PATENT DOCUMENTS

| | | | | |
|---|---|---|---|---|
| 6,980,036 B2* | 12/2005 | Kwon | .................. | H03K 5/1534 327/116 |
| 7,952,510 B2* | 5/2011 | Shimomura | ........ | H03M 1/1023 341/164 |
| 9,093,911 B2* | 7/2015 | Telefus | ............. | H02M 3/33576 |
| 9,118,253 B2* | 8/2015 | Telefus | ............. | H02M 3/33576 |
| 9,184,668 B2* | 11/2015 | Telefus | ............. | H02M 3/33523 |
| 9,450,698 B2* | 9/2016 | Matsunaga | ......... | H04J 14/0227 |
| 9,634,572 B2* | 4/2017 | Jin | ......................... | H02M 3/156 |
| 9,685,859 B2* | 6/2017 | Akahane | ................. | H02M 1/32 |
| 9,991,797 B2* | 6/2018 | Akahane | ................. | H03K 17/18 |
| 10,866,878 B2* | 12/2020 | Chatty | ...................... | G06F 8/34 |
| 10,978,945 B2* | 4/2021 | Matsuda | ................ | H02M 7/06 |

FOREIGN PATENT DOCUMENTS

JP 2019-20822 A 2/2019

* cited by examiner

*Primary Examiner* — Mohammad K Islam
(74) *Attorney, Agent, or Firm* — Harness, Dickey & Pierce, P.L.C.

(57) ABSTRACT

An input module of an industrial control apparatus receives a digital signal from an external source, outputs a binary signal as an internal signal, and determines a level of the digital signal based on the internal signal. The input module determines that the digital signal has a low level when a low level of the internal signal continues for a certain time period, determines that the digital signal has a high level when the internal signal switches from the low level to a high level and then switches to the low level again, and determines an occurrence of a fixing failure when the internal signal switches from the low level to the high level and then fails to switch to the low level again.

8 Claims, 10 Drawing Sheets

INPUT MODULE OF INDUSTRIAL CONTROL APPARATUS

CROSS REFERENCE TO RELATED APPLICATION

The present application claims the benefit of priority from Japanese Patent Application No, 2019-138794 filed on Jul. 29, 2019. The entire disclosure of the above application is incorporated herein by reference.

TECHNICAL FIELD

The present disclosure relates to an input module of an industrial control apparatus.

BACKGROUND

There has been known an input module provided to an industrial control apparatus.

SUMMARY

The present disclosure provides an input module of an industrial control apparatus. The input module receives a digital signal from an external source, outputs a binary signal as an internal signal, and determines a level of the digital signal based on the internal signal. The input module determines that the digital signal has a low level when a low level of the internal signal continues for a certain time period, determines that the digital signal has a high level when the internal signal switches from the low level to a high level and then switches to the low level again, and determines an occurrence of a fixing failure when the internal signal switches from the low level to the high level and then fails to switch to the low level again.

BRIEF DESCRIPTION OF DRAWINGS

Objects, features and advantages of the present disclosure will become apparent from the following detailed description made with reference to the accompanying drawings. In the drawings.

DETAILED DESCRIPTION

Figure 1:
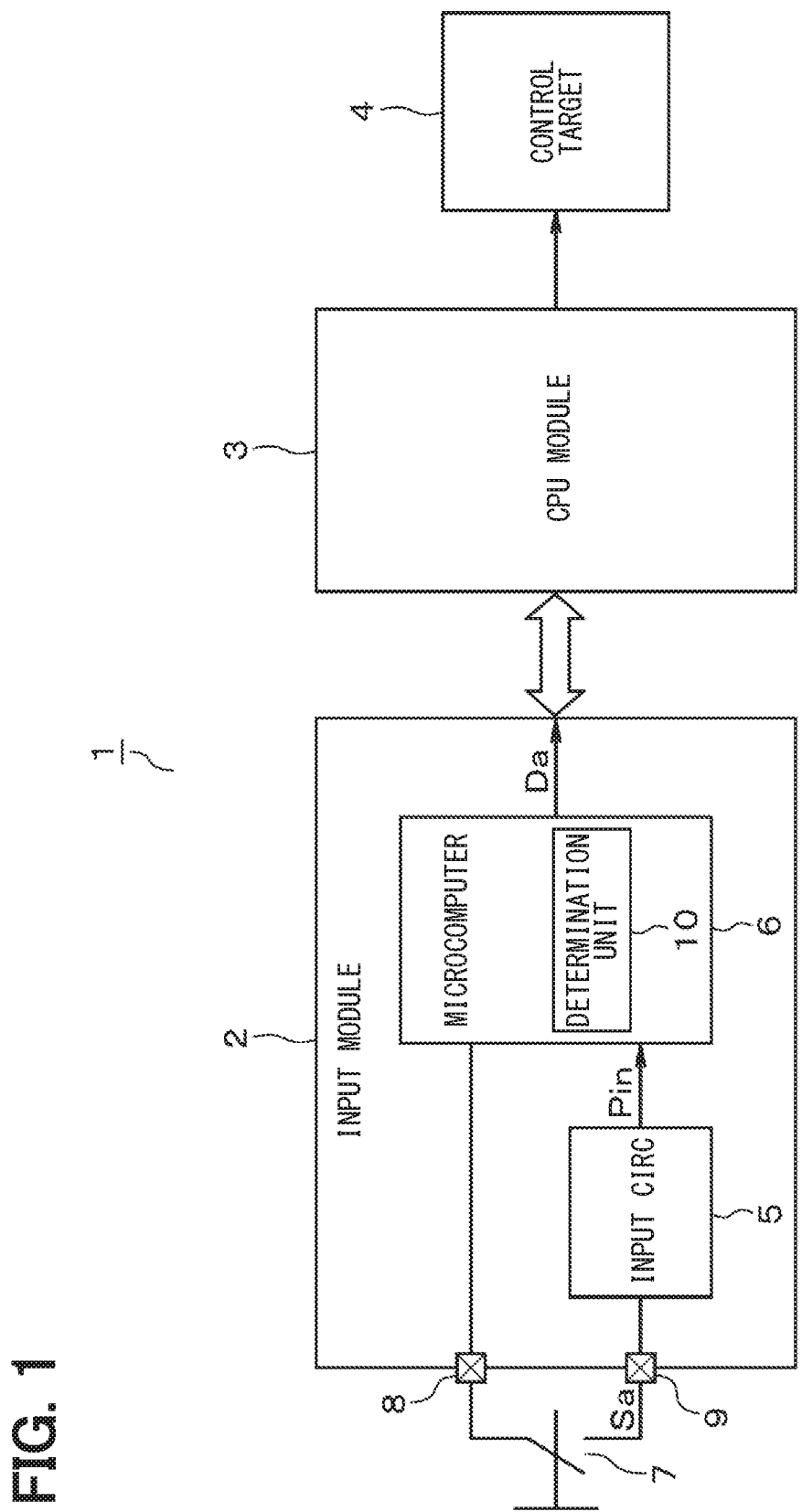
FIG. 1 is a diagram schematically showing a configuration of a programmable logic controller (PLC) according to a first embodiment.

For example, in an industrial control apparatus such as a programmable logic controller, an input module is provided for transmitting digital signals output from various sensors, various switches and so on, to a CPU module that controls an overall operation of the industrial control apparatus.

From a viewpoint of functional safety, an input module of an industrial control apparatus is required to detect a circuit failure occurred in the input module, that is, a self-diagnosis function. Enabling detection of a fixing failure of an input circuit, which will be described later, is extremely important in improving a safety of the industrial control apparatus. Hereinafter; a fixing failure of the input circuit will be described.

The input module includes an input circuit that converts a digital signal input from outside to an electronic signal level that can be input to the internal microcomputer. Then, the input module outputs the converted signal, which is a binary internal signal, to the microcomputer. The input circuit includes a switching element, for example, a NPN bipolar transistor disposed at an output stage.

One main terminal, for example, a collector of the switching element is connected with a power supply line to which a power supply voltage, for example, 3.3 Volt is supplied. The supply voltage corresponds to a high level of the internal signal. Another terminal, for example, an emitter of the switching element is connected with a ground level, for example, 0 volt. The ground level corresponds to a low level of the internal signal. The switching element turns on when the digital signal is high level, and turns off when the digital signal is low level. A level of another terminal of the switching element is output to the microcomputer as the internal signal.

In the above-described configuration, a failure, for example, a fixing failure may occur due to a fixing of another terminal of the switching element. The fixing of another terminal may occur due to a short circuit of another terminal with the power supply line or the like. In the following description, the fixing occurred due to the short circuit with the power supply line may be referred to as a high fixing. When a failure due to the high fixing occurs, the internal signal output from the input circuit always has the high level regardless of the level of the digital signal. Thus, when the digital signal is the low level, the microcomputer may erroneously determine that the digital signal is the high level.

The industrial control apparatus may control an industrial robot as a control target. In this case, the input module is used to input a digital signal indicating an operation state of an emergency stop switch. The emergency stop switch is provided for emergently stopping an operation of the industrial robot. Usually, a normally closed switch is used as the emergency stop switch. The digital signal has the high level, for example, 24 volts when the emergency stop switch is not operated. When the emergency stop switch is operated, the digital signal switches to the low level, for example, 0 volt.

In the input circuit, when a failure due to the high fixing occurs, the microcomputer of the input module and the CPU module may have the high level digital signal even when the digital signal actually has the low level caused by the operation of the emergency stop switch, Thus, the emergency stop switch is erroneously determined to be not operated even when the emergency stop switch is actually operated. In the industrial control apparatus, such erroneous determination is not allowed, and it is necessary to surely prevent an erroneous determination.

In the input module, an input path for inputting a single digital signal may be intentionally made redundant. That is, the input circuit may include multiple channel systems as a multi-channel structure, and a single digital signal is input to the multiple channels. Thus, when inputting a single digital signal, the high fixing may be detected by the multi-channel structure. However, the multi-channel structure requires a complicated structure of the input module circuit, and thus, causes an increase of a manufacturing cost.

Hereinafter, multiple embodiments will be described with reference to the drawings. In each embodiment, substantially the same components are denoted by the same reference numerals and description thereof is omitted.

(First Embodiment)

The following will describe a first embodiment of the present disclosure with reference to FIG. 1 to FIG. 12.

As shown in FIG. 1, a programmable logic controller 1 corresponding to an industrial control apparatus includes an input module 2, a CPU module 3, an output module (not shown).

In the present disclosure, the programmable logic controller may be referred to as PLC. The PLC 1 controls an operation of a control target 4, such as an industrial robot. Each module, such as the input module 2, or the CPU module 3 that constitutes the PLC 1 is configured to be able to communicate with each other via a bus communication line.

The input module 2 is a digital input module and inputs, to the CPU module 3, a digital signal which is applied from an external source. The input module 2 includes an input circuit 5 and a microcomputer 6. The input module 2 inputs the digital signal Sa. A value of the digital signal Sa switches according to an operation state of the emergency stop switch 7 provided for emergently stopping an operation of the control target 4. The emergency stop switch 7 is a normally closed switch. A first terminal of the emergency stop switch 7 is connected with a terminal 8 of the input module 2. The terminal 8 of the input module is arranged at a terminal block of the input module 2. A second terminal of the emergency stop switch 7 is connected with a terminal 9 of the input module 2. The terminal 9 of the input module is also arranged at the terminal block of the input module 2.

The microcomputer 6 of the input module 2 is configured to constantly supply, to the terminal 8, a voltage, for example, 24 Volts corresponding to a high level of the digital signal Sa. In this configuration, a signal of the second terminal of the emergency stop switch 7, that is, the signal provided to the terminal 9 of the input module 2 corresponds to the digital signal Sa. In the above configuration, the digital signal Sa is a signal indicating an operation state of the emergency stop switch 7. Specifically, the digital signal Sa has a high level of, for example, 24 volts when no operation is made to the emergency stop switch 7, and the digital signal Sa has a low level, for example, 0 Volt when the emergency stop switch 7 is operated.

The input circuit 5 outputs a binary internal signal Pin according to the digital signal Sa input through the terminal 9. Specifically, the input circuit 5 converts the digital signal Sa into a level that can be input to the microcomputer 6, and outputs the binary internal signal Pin obtained by the level conversion to the microcomputer 6. The input circuit 5 includes a photo coupler which will be described later, and the photo coupler electrically insulates the emergency stop switch 7 disposed outside of the input module 2 from the microcomputer 6 disposed inside of the input module 2.

The microcomputer 6 has a determination unit 10 that determines a value, that is, a level of the digital signal Sa based on the internal signal Pin. The determination unit 10 outputs a determination result to the outside of the input module 2. The determination unit 10 is provided by an execution of a process by a central processing unit (CPU) of the microcomputer 6. The process is executed by an execution of a computer program stored in a read only memory (ROM) of the microcomputer 6. That is, the determination unit 10 is implemented in a software manner. The determination unit 10 may be implemented in a hardware manner, or may also be implemented a combination of software manner and hardware manner. The determination unit 10 transmits data Da indicating the determination result to the CPU module 3. With respect to the input module 2, the CPU module 3 functions as an external device to which the determination result determined by the determination unit 10 is output. The determination unit 10 detects an occurrence of a fixing failure caused by a high fixing of the input circuit 5. When the occurrence of the fixing failure is detected, the determination unit 10 transmits the detection of the fixing failure as the determination result to the CPU module 3. Details will be described later.

As described above, the CPU module 3 receives, from the input module 2, the data Da indicating the determination result of the value of the digital signal Sa. The CPU module 3 recognizes, that is, detects the operation state of the emergency stop switch 7 based on the data Da. When recognizing that no operation is made to the emergency stop switch 7, the CPU module 3 controls the operation of the control target 4 as usual. When the CPU module 3 recognizes that an operation is made to the emergency stop switch 7, the CPU module 3 stops the operation of the control target 4 by, for example, stopping a power supply to the control target 4. When the CPU module 3 recognizes an occurrence of the fixing failure caused by the high fixing of the input circuit 5 based on the data Da, the CPU module 3 executes a process for stopping the operation of the control target 4 and a process for notifying the occurrence of the fixing failure to the user.

(Configuration of Input Module 2)

Figure 2:
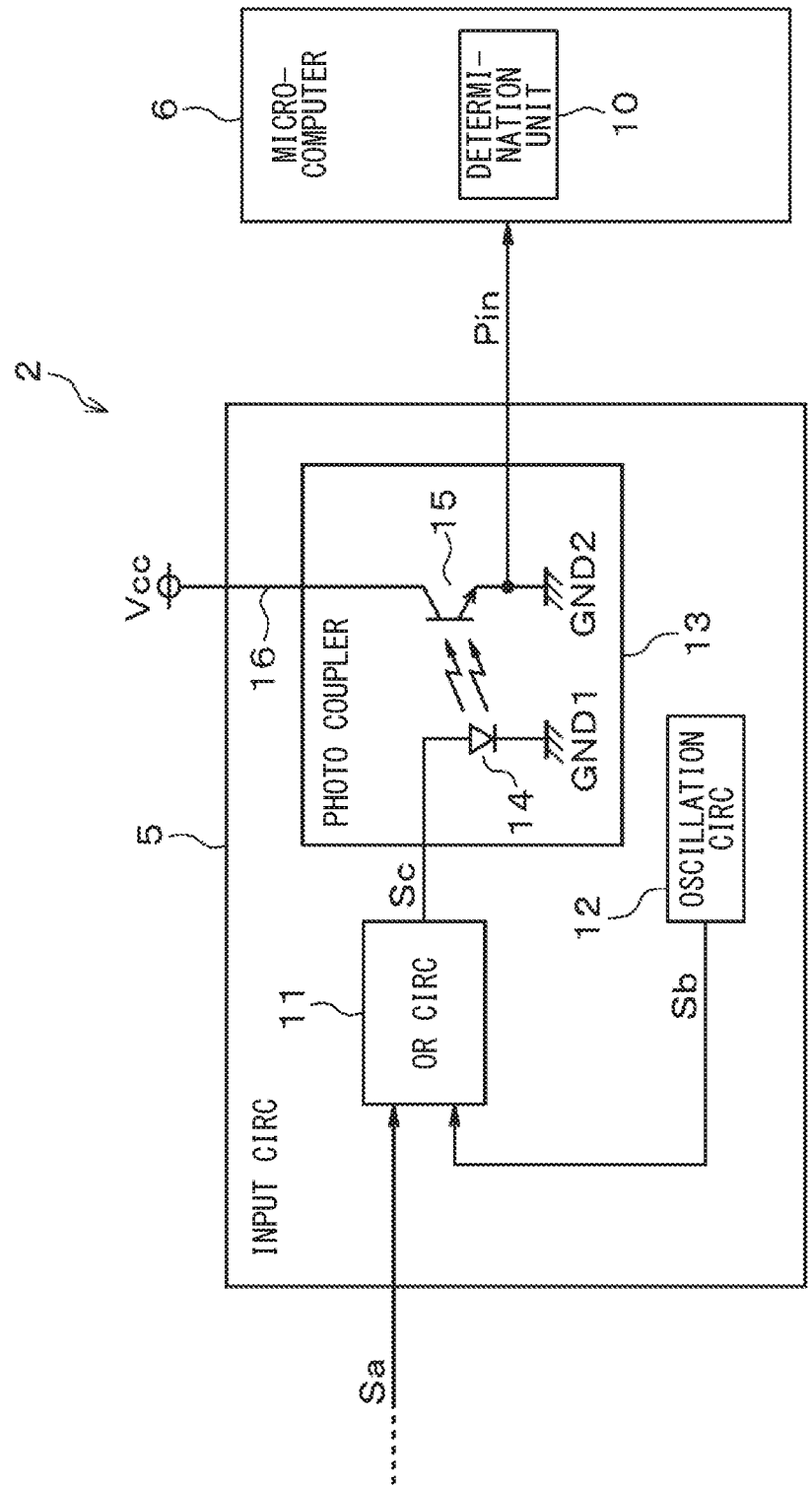
FIG. 2 is a diagram schematically showing a specific configuration example of an input module according to the first embodiment.
Figure 3:
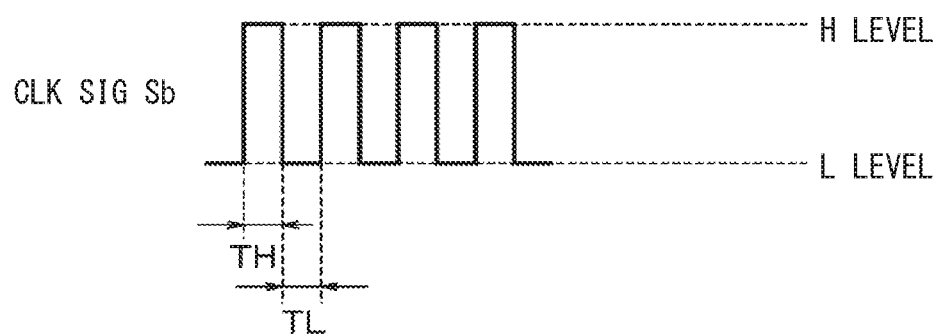
FIG. 3 is a diagram schematically showing a clock signal according to the first embodiment.

FIG. 2 shows an exemplary configuration of the input module 2. As shown in FIG. 2, the input circuit 5 includes an OR circuit 11, an oscillation circuit 12, and a photo coupler 13. The OR circuit 11 receives the digital signal Sa and the clock signal Sb, and outputs a logical sum signal Sc indicating a logical sum of the digital signal Sa and the clock signal Sb. The oscillation circuit 12 generates the clock signal Sb described above. As shown in FIG. 3, the clock signal Sb is a binary signal, and a value of the clock signal Sb alternately switches at a predetermined cycle. A duty ratio of the clock signal Sb may be set to 50% for ease of generation. In the drawings showing binary signals, such as FIG. 3, the high level is abbreviated as H level, and the low level is abbreviated as L level.

The photo coupler 13 functions as a signal output unit, and includes a light emitting diode 14 and an NPN type phototransistor 15. An anode of the light emitting diode 14 is connected with an output terminal of the logical sum circuit 11, and a cathode of the light emitting diode 14 is connected with a ground GND1 of a primary side. The phototransistor 15 corresponds to a switching element. A collector of the phototransistor 15, which corresponds to a first main terminal, is connected with a power supply line 16. The power supply line 16 is supplied with a source voltage having a voltage of Vcc, for example, 3.3 Volts. The source voltage is also referred to as a first voltage, and corresponds to the high level of the internal signal Pin. The power supply line 16 corresponds to a first supply line.

An emitter of the phototransistor 15, which corresponds to a second main terminal, is connected with a ground GND2 of a secondary side. The ground GND2 is supplied with a second voltage, for example, 0 Volt. The second voltage corresponds to the low level of the internal signal Pin. The ground GND2 corresponds to a second supply line. With this configuration, the phototransistor 15 turns on when the logical sum signal Sc has a high level, and turns off when the logical sum signal Sc has a low level.

Figure 4:
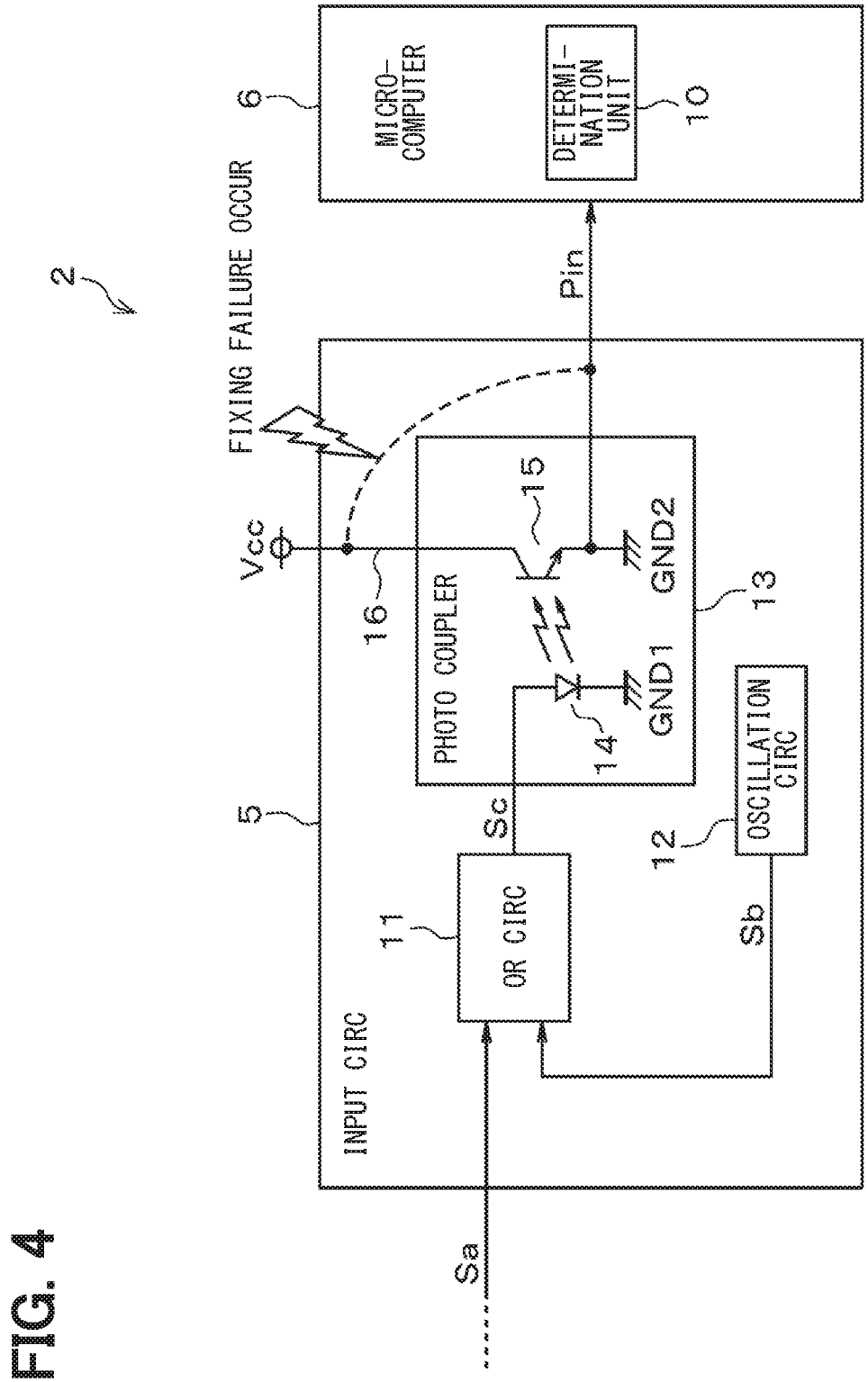
FIG. 4 is a diagram for explaining a fixing failure of an input circuit according to the first embodiment.

In the above-described configuration, the signal output from the emitter of the phototransistor 15, that is, an output signal of the photo coupler 13 is transmitted to the microcomputer 6 as the internal signal Pin. As shown in FIG. 4, in the above configuration, a fixing failure caused by a short circuit of an output terminal of the photo coupler 13, that is, the emitter of the phototransistor 15 with the power supply line 16 corresponds to the above-described fixing failure due to the high fixing of the input circuit 5.

(Configuration of OR Circuit 11)

Figure 5:
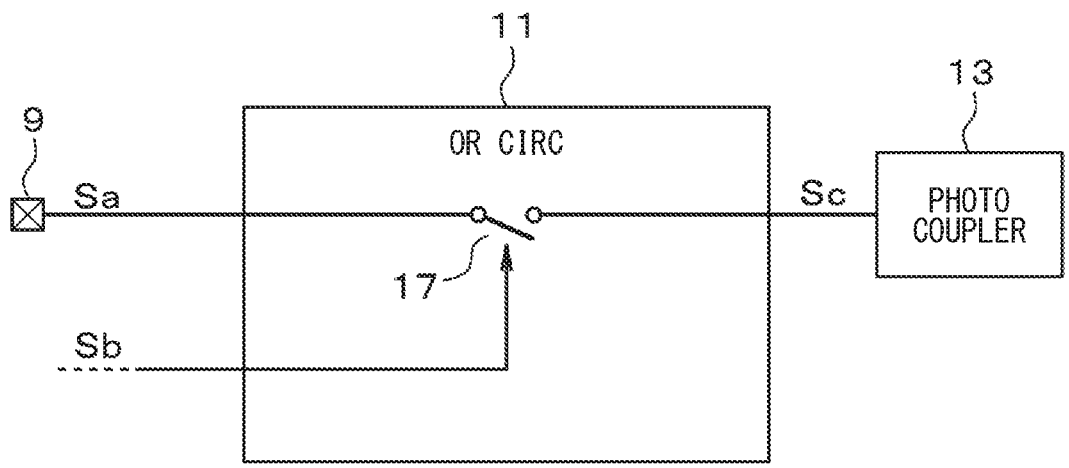
FIG. 5 is a diagram schematically showing a first specific configuration example of an OR circuit according to the first embodiment.
Figure 6:
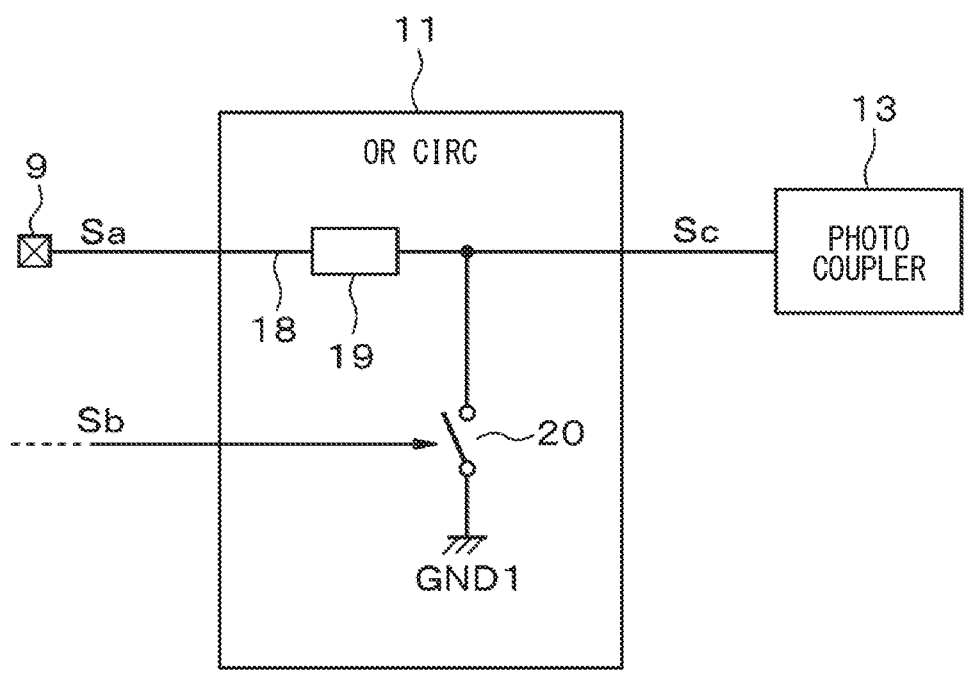
FIG. 6 is a diagram schematically showing a second specific configuration example of the OR circuit according to the first embodiment.

The OR circuit 11 may have an exemplary configuration shown in FIG. 5 or FIG. 6. In the first exemplary configuration shown in FIG. 5, the OR circuit 11 may include a switch 17 interposed between the terminal 9 and an input terminal of the photo coupler 13, that is, the anode of the light emitting diode 14. In this configuration, the switch 17 turns on when the clock signal Sb has the high level and turns off when the clock signal Sb has the low level.

In the second exemplary configuration shown in FIG. 6, the OR circuit 11 may include a resistor 19 and a switch 20. The resistor is interposed in series in a signal line 18 extending from the terminal 9 to the input terminal of the photo coupler 13. The switch 20 is interposed between a terminal of the resistor 19, which is connected with the photo coupler 13, and the ground GND1. In this configuration, the switch 20 turns off when the clock signal Sb has the high level and turns on when the clock signal Sb has the low level. According to the configuration, an input signal to the photo coupler 13 has a low level or a high level, that is, high impedance in response to a turn-on or turn-off of the switch 20. In this configuration, a current flowing from the signal line 18 to the ground GND1 is limited by the resistor 19 when the switch 20 is turned on.

(Operation of Determination Unit 10)

The microcomputer 6 is configured to acquire a level of the internal signal Pin at every predetermined sampling cycle. The sampling cycle is sufficiently shorter than the predetermined cycle of the clock signal Sb. The determination unit 10 determines a value of the digital signal Sa based on the value of the internal signal Pin obtained as described above, and detects the fixing failure due to the high fixing of the input circuit 5.

The following will describe a determination process carried out by the determination unit 10. When the internal signal Pin continues low level for at least a certain time period Ta, the determination unit 10 determines that the digital signal Sa is low level. The certain time period Ta is preliminarily determined to be sufficiently longer than the predetermined cycle of the clock signal Sb. The determination unit 10 determines the digital signal Sa is high level when (i) the low level of the internal signal Pin switches to the high level and the high level of the internal signal Pin continues for a first time period T1 and then (ii) the high level of the internal signal Pin switches to the low level and the low level of the internal signal Pin continues for a second time period T2.

Alternatively, the determination unit 10 determines the digital signal Sa is high level when (i) the high level of the internal signal Pin switches to the low level and the low level of the internal signal Pin continues for the second time period T2 and then (ii) the low level of the internal signal Pin switches to the high level and the high level of the internal signal Pin continues for the first time period T1. In the present embodiment, the first time period T1 is set corresponding to a period TH in which the clock signal Sb is high level. Specifically, the first time period is set substantially the same as the period TH. In the present embodiment, the second time period T2 is set corresponding to a period TL in which the clock signal Sb is low level. Specifically, the second time period is set substantially the same as the period TL. As described above, the clock signal Sb has the duty ratio of 50%. Thus, the first time period T1 and the second time period T2 each is equal to half cycle of the clock signal Sb.

The determination unit 10 continues the period in which the internal signal Pin has the high level for the first time period T1 immediately after detecting a rising edge at which the internal signal Pin switches from the low level to the high level. The determination unit 10 continues the period in which the internal signal Pin has the low level for the second time period T2 immediately after detecting a falling edge at which the internal signal Pin switches from the high level to the low level. Alternatively, the determination unit 10 determines the digital signal Sa is high level when (i) the low level of the internal signal Pin continues for the second time period T2 after detection of the falling edge and then (ii) the high level of the internal signal Pin continues for the first time period T1 after detection of the rising edge.

The determination unit 10 determines the occurrence of the fixing failure in the input circuit 5 when (i) the high level of the internal signal Pin does not switch to the low level again after switching from the low level to the high level or (ii) the high level of the internal signal Pin switches to the low level again and continues the low level for a time period shorter than the second time period T2 after switching from the low level to the high level. The determination unit 10 determines the occurrence of the fixing failure in the input circuit 5 when (i) no falling edge is detected when the first time period T1 during which the internal signal Pin has the high level is elapsed after the detection of rising edge or (ii) the low level of the internal signal Pin continues for shorter than the second time period T2 after the detection of falling edge.

Figure 7:
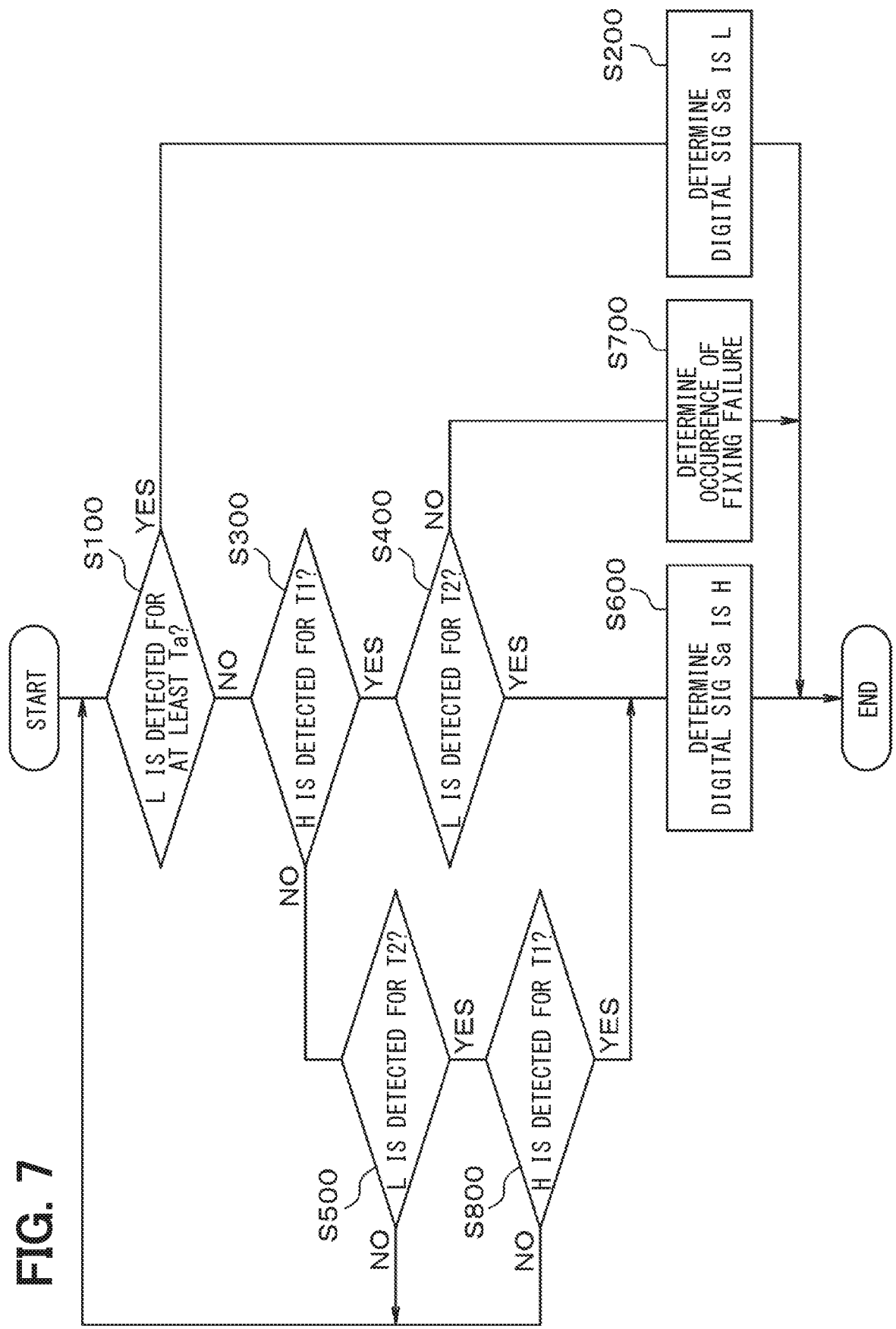
FIG. 7 is a diagram showing a determination process executed by a determination unit according to the first embodiment.

FIG. 7 shows a specific process executed by the determination unit 10 for implementing the above-described determination process. In FIG. 7 to FIG. 12, the high level of each signal is abbreviated as "H" or "H LEVEL", and the low level of each signal is abbreviated as "L" or "L LEVEL". First, in S100, the determination unit 10 determines whether the low level of the internal signal Pin is continually detected for at least the certain time period Ta. When determining the detection of the low level of the internal signal Pin for at least the certain time period Ta, that is the determination in S100 is YES, the process proceeds to S200. In S200, the determination unit 10 determines that the digital signal Sa is the low level. After execution of S200, the procure is terminated.

When failing to detect the low level of the internal signal Pin for at least the certain time period Ta, that is the determination in S100 is NO, the process proceeds to S300. In step S300, the determination unit 10 determines whether the high level of the internal signal Pin is continually detected for the first time period T1. When determining that the high level of the internal signal Pin is continually detected for the first time period T1, the process proceeds to S400. When failing to detect the high level of the internal signal Pin continually for the first time period T1, the process proceeds to S500. In S400, the determination unit 10 determines whether the low level of the internal signal Pin is continually detected for the second time period T2.

When determining that the low level of the internal signal Pin is continually detected for the second time period T2, that is the determination in S400 is YES, the process proceeds to S600. In S600, the determination unit 10 determines that the digital signal Sa is the high level. When failing to detect the low level of the internal signal Pin continually for the second time period T2, that is determination in S400 is NO, the process proceeds to S700. In S700, the determination unit 10 determines an occurrence of the fixing failure caused by the high fixing in the input circuit 5. After execution of S600 or S700, the process ends. In S500, the determination unit 10 determines whether the low level of the internal signal Pin is continually detected for the second time period T2. When failing to detect the low level of the internal signal Pin continually for the second time period T2, that is determination in S500 is NO, the process returns to S100.

When detecting the low level of the internal signal Pin continually for the second time period T2, that is determination in S500 is YES, the process proceeds to S800. In S800, when detecting the high level of the internal signal Pin continually for the first time period T1, the determination in S800 is YES, and the process proceeds to S600. In S600, the digital signal Sa is determined to be the high level. In S800, when failing to detect the high level of the internal signal Pin continually for the first time period T1, the determination in S800 is NO, and the process returns to S100.

In the above configuration, the level of the internal signal Pin in the normal state does not switch during a half period (half cycle) of the clock signal Sb. Herein, the normal state indicates a properly operating state without any failure or interference. When the level of the internal signal Pin switches during a period shorter than half cycle of the clock signal Sb, it is considered that the switching is due to an influence of noise or the like superimposed on the input circuit 5 of the input module 2 or the like. When the determination unit 10 accurately captures level switch in the internal signal Pin due to the influence of noise or the like, and determines the level of the digital signal Sa based on the level switch, the determination accuracy may be decreased or an erroneous determination may be made.

Suppose that the level of the internal signal Pin repeatedly switches during a period shorter than half cycle of the clock signal Sb. For example, the level of the internal signal Pin switches to another level and then returns to the original level. In this case, the determination unit 10 may execute an interpolation process which considers no level switch is occurred to the internal signal Pin. In the interpolation process, after a first edge, for example, a rising edge of the internal signal Pin is detected and a second edge, for example, a falling edge of the internal signal Pin is detected before an elapse of half cycle of the clock signal Sb from the detection of the first edge, the detection of the second edge is ignored and the detection result is rewritten so that the level, for example, the high level before the detection of the second edge is maintained.

In the above configuration, execution of the interpolation process with no restriction will cause the following difficulty. When noise is continuously superimposed on the input module 2, the level of the internal signal Pin may continuously switch due to the influence of noise. When the determination unit 10 continuously executes the interpolation process, the determination unit 10 fails to correctly determine the level of the digital signal Sa for a relatively long period. Thus, the CPU module 3 also fails to correctly determine the operation state of the emergency stop switch 7. When the emergency stop switch 7 is operated due to an abnormality occurred in the control target 4 during the relatively long execution period of the interpolation process, the CPU module 3 fails to detect the operation made to the control target 4 and accordingly fails to emergently stop the control target 4.

The determination unit 10 stops the determination of the value of the digital signal Sa when the interpolation process is continuously executed for a predetermined set time period Tb. That is, the determination unit 10 stops the determination of the value of the digital signal Sa when a duration of the interpolation process reaches the set time period Tb. After stopping the determination of the value of the digital signal Sa, the determination unit 10 outputs, to the CPU module 3, data Da indicating the same determination result in a case where the emergency stop switch 7 is operated, as the determination result of the value of the signal Sa. With this configuration, when the determination unit 10 fails to determine the level of the digital signal Sa for a relatively long period due to the influence of noise or the like, the CPU module 3 executes similar process to a process executed when the emergency stop switch 7 is operated. That is, the CPU module 3 executes a process for emergently stopping the operation of the control target 4.

Figure 8:
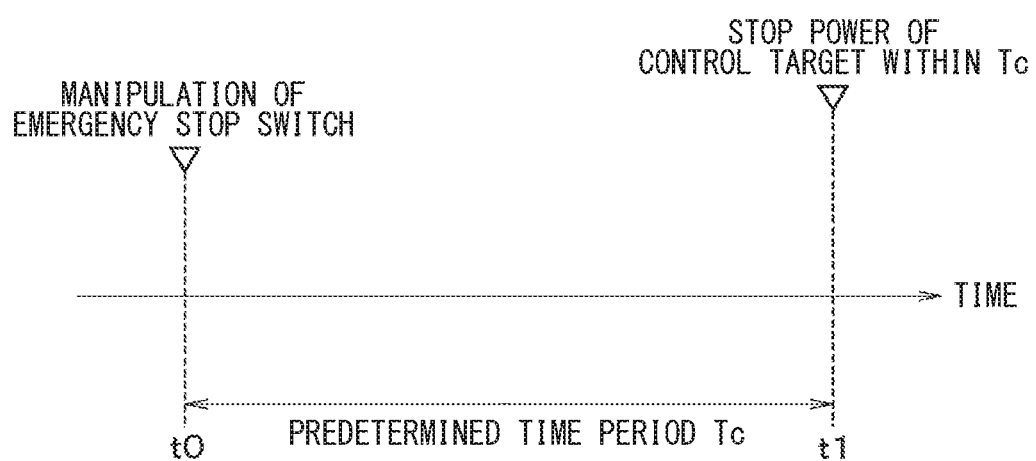
FIG. 8 is a diagram for explaining a predetermined time period according to the first embodiment.

In the present embodiment, the set time period Tb described above is set with consideration of particular circumstances of the PLC 1 which corresponds to the industrial control apparatus. As shown in FIG. 8, as a design specification of PLC 1, an upper limit of a time period required from a time point t0 when the emergency stop switch 7 is manipulated to a time point t1 when the operation, more specifically, power of the control target 4 is actually stopped is specified in advance as a predetermined time period Tc. A necessary time period Td required for the CPU module 3 executes the process for stopping the operation of the control target 4 in response to the emergency occurrence is predetermined according to the design specification of the CPU module 3.

With consideration of the design specification of the CPU module 3, the set time period Tb is set to a time period obtained by subtracting at least the necessary time period Td from the predetermined time period Tc. In other words, the set time period Tb is set to satisfy the following expression 1.

$$Tc > Tb + Td \qquad \text{(Expression 1)}$$

Figure 9:
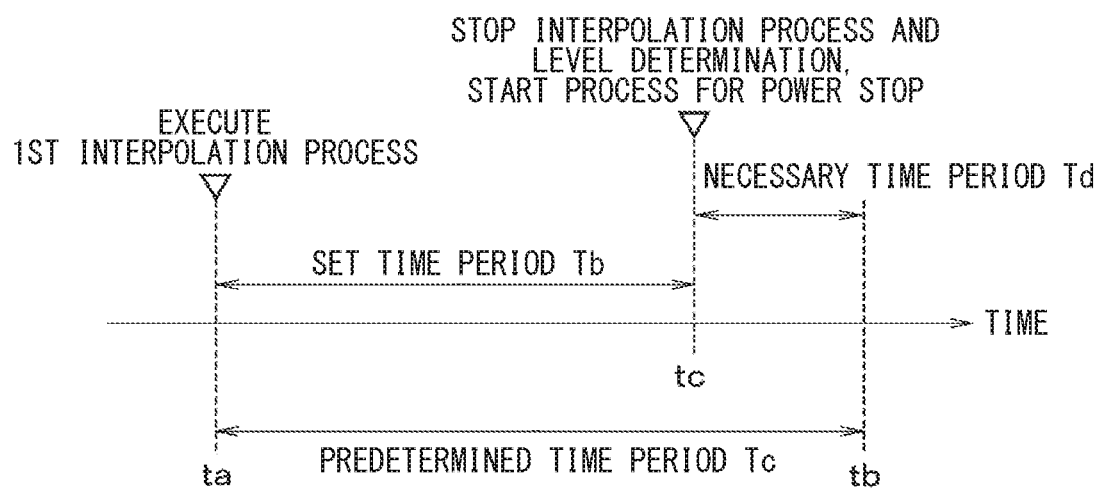
FIG. 9 is a diagram for explaining a set time period according to the first embodiment.

With the above setting of time period Tb, as shown in FIG. 9, the interpolation process and the level determination of the digital signal Sa are stopped at a time point tc. The time point tc is prior to the time point tb at which the predetermined time period Tc has elapsed from the time point ta at which the interpolation process was executed first by at least the necessary time period Td. As a result, the process for stopping the operation, more specifically, the power of the control target 4 starts at the time point tc. With this configuration, when the emergency stop switch 7 is operated at the time point ta, which is the time point when the interpolation process is executed first, the operation of the control target 4 can be surely stopped by the time point tb at which the predetermined time period Tc has elapsed from the time point ta at which the interpolation process was executed.

Figure 10:
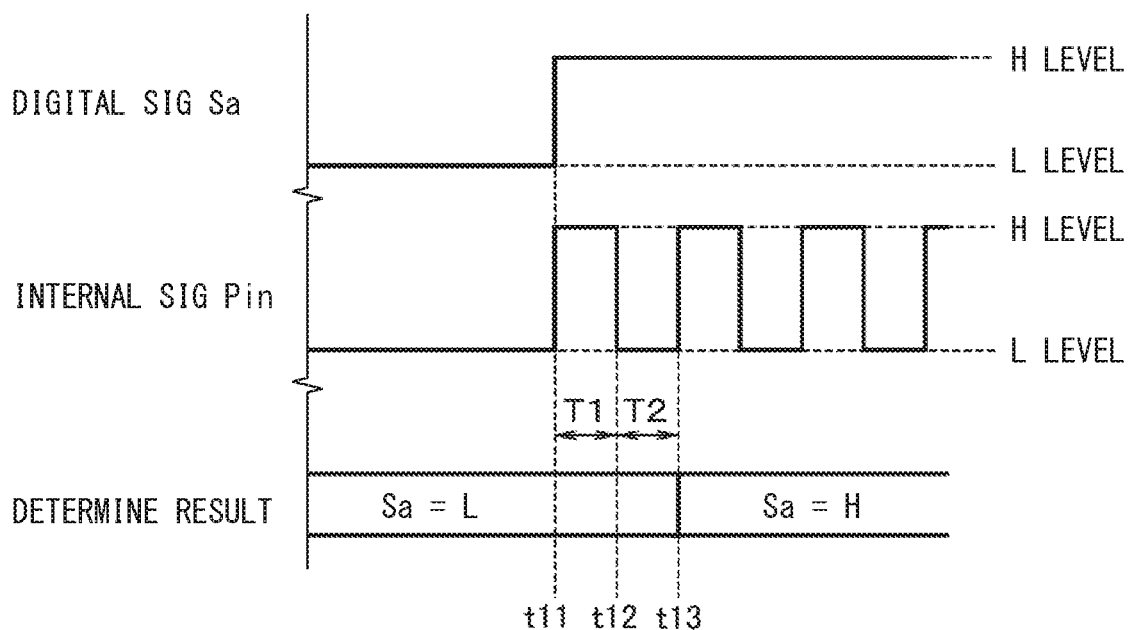
FIG. 10 is a diagram for explaining a determination result when a digital signal is high level in a normal state according to the first embodiment.
Figure 11:
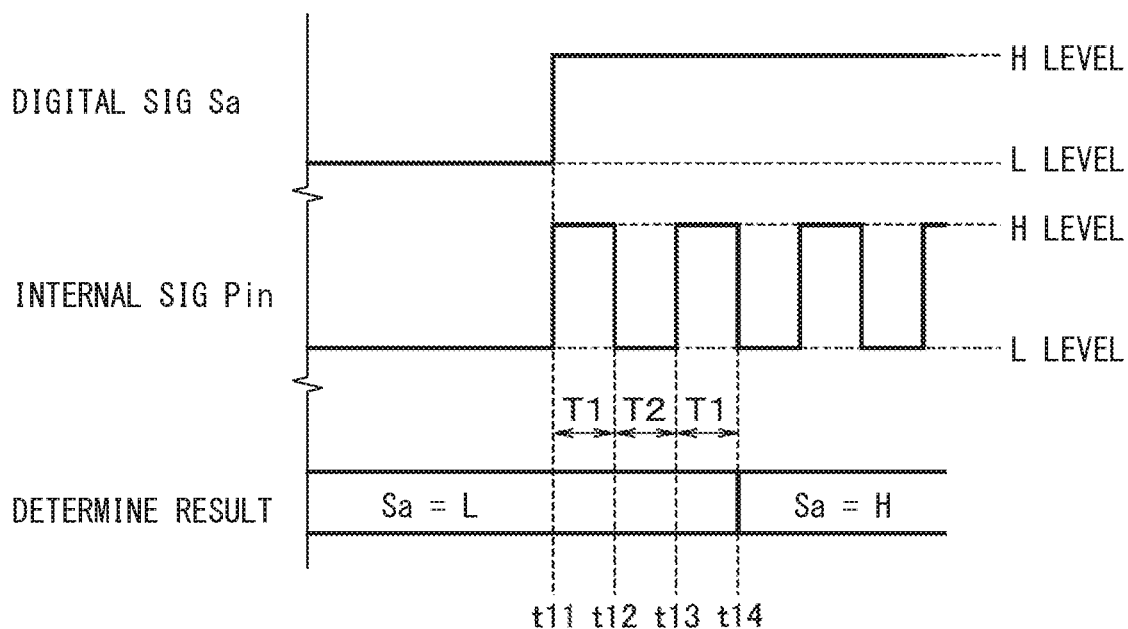
FIG. 11 is a diagram for explaining a determination result when a digital signal is high level in a normal state according to the first embodiment.
Figure 12:
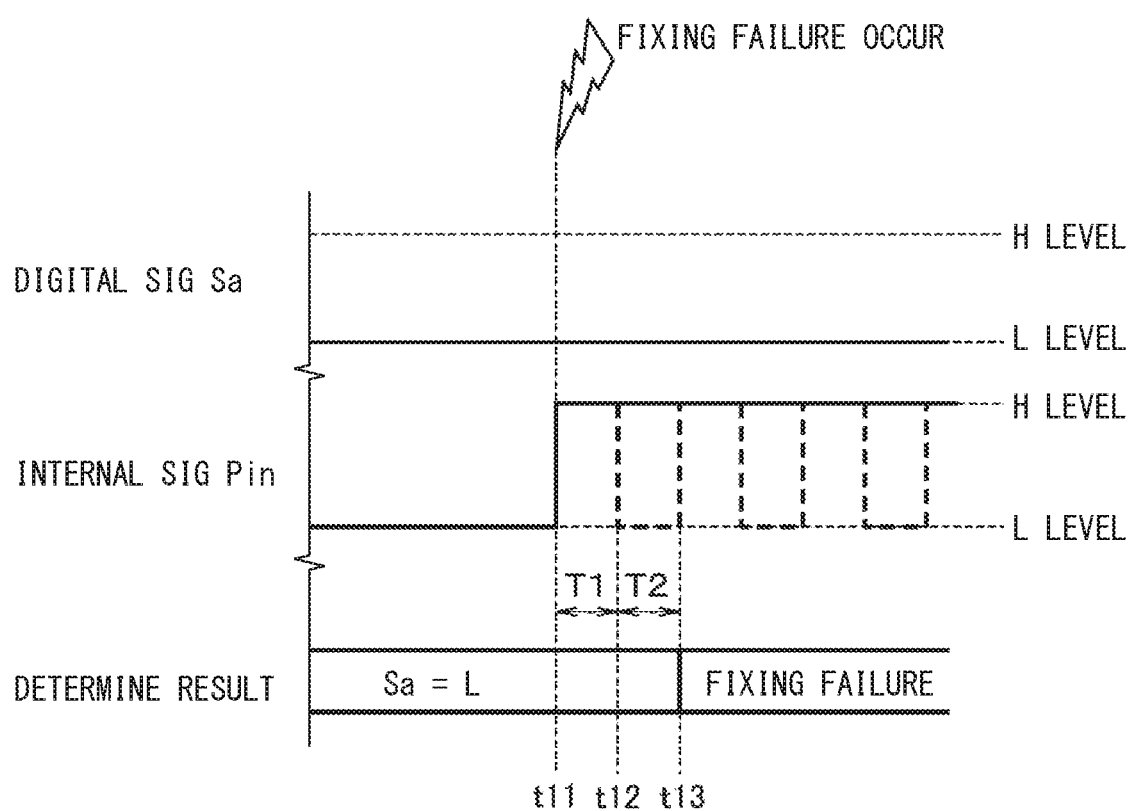
FIG. 12 is a diagram for explaining a determination result when a fixing failure occurs according to the first embodiment.

The following will describe operations according to the present embodiment with reference to FIG. 10 to FIG. 12. The high level determination of the digital signal Sa in the normal state will be described.

When the digital signal Sa is high level, the termination unit 10 determines the high level as the follows. As shown in FIG. 10, when the low level of the digital signal Sa switches to the high level at a time point t11, the level of the internal signal Pin alternately switches between high level and low level with the same cycle of the clock signal Sb.

The determination unit 10 determines the digital signal Sa is high level at a time point t13, that is Sa=H, when detecting that (i) the high level of the internal signal Pin continues from the time point t11 for the first time period T1, (ii) then falls to the low level at a time point t12, and (iii) then the low level of the internal signal Pin continues for the second time period T2 to the time point t13. When the noise or the like is implemented, the determination unit 10 may fail to detect that the high level of the internal signal Pin continues for the first time period T1 from the time point t11.

As shown in FIG. 11, when failing to detecting the high level of the internal signal Pin continues for the first time period T1, the determination unit 10 determines the digital signal Sa is high level at a time point t14 when detecting that (i) the internal signal Pin switches to the low level at the time point t12 and the low level continues for the second time period T2, and then (ii) the low level of the internal signal Pin switches to the high level at a time point t13 and the high level continues for the first time period T1. As described above, when the digital signal Sa switches from the low level to the high level in the normal state, the determination unit 10 is able to determine that the digital signal Sa is high level after one cycle or 1.5 cycles of the clock signal Sb from the time point t11 at which the digital signal switches from the low level to the high level.

The determination of fixing failure occurrence will be described. When the fixing failure occurs due to the high fixing of the input circuit 5, the determination unit 10 determines the occurrence of the fixing failure as follows. As shown in FIG. 12, when the fixing failure shown in FIG. 4 occurs in the input circuit 5, the internal signal Pin switches from the low level to the high level at the time point t11. In FIG. 12, for comparison, a waveform of the internal signal Pin during the high level of the digital signal Sa in the normal state is shown by a dotted line.

As shown in FIG. 12, when the fixing failure occurs, the internal signal Pin does not switch to the low level at the time point 12 after the first time period T1 has elapsed from the time point t11. Further, when the fixing failure occurs, the internal signal Pin does not switch to the low level at the time point 13 after the second time period T2 has elapsed from the time point t12. Therefore, the determination unit 10 determines an occurrence of the fixing failure in the input circuit 5 at the time point t13, As described above, when the fixing failure occurs in the input circuit 5, the determination unit 10 can determine the occurrence of the fixing failure after one cycle of the clock signal Sb from the time point t11 at which the fixing failure occurs.

As described above, in the normal state, the level of the internal signal Pin output from the input circuit 5 switches as follows according to the value, that is, the level of the digital signal Sa. In the normal state, during the low level of the digital signal Sa, the logical sum signal Sc has the low level, and thus, the photo coupler 13 and the phototransistor 15 are in off state. Thus, the internal signal Pin is always low level. The determination unit 10 determines that the digital signal Sa is low level when the internal signal Pin continuously maintains the low level at least for the certain time period Ta. With this configuration, in the normal state, the determination unit 10 is able to correctly determine the value of the digital signal Sa based on the internal signal Pin during the period while the digital signal Sa is low level.

In the normal state, while the digital signal Sa is high level, the logical sum signal Sc alternately switches the high level and the low level at the same cycle with the cycle of the clock signal Sb. Thus, in the normal state, while the digital signal Sa is high level, the phototransistor 15 alternately turns on and turns off at the same cycle with the cycle of the clock signal Sb. Thus, the level of the internal signal Pin alternately switches between high and low at the same cycle with the cycle of the clock signal Sb. When the internal signal Pin switches from the low level to the high level and then switches again from the high level to the low level, the determination unit 10 determines that the digital signal Sa is the high level. When the internal signal Pin switches from the high level to the low level and then switches again from the low level to the high level, the determination unit 10 determines that the digital signal Sa is the high level. Thus, in the normal state, the determination unit 10 is able to correctly determine the value, that is, the level of the digital signal Sa based on the internal signal Pin during the high level of the digital signal Sa.

When the fixing failure occurs in the input circuit 5, the level of the internal signal Pin output from the input circuit 5 does not switch according to the level of the digital signal Sa and always maintain the high level regardless of the level of the digital signal Sa. The determination unit 10 determines an occurrence of the fixing failure in the input circuit 5 when the internal signal Pin switches from the low level to the high level and then fails to switch to the low level again.

In the above-described configuration, the determination unit 10 is able to distinguish and correctly determine the high level of the digital signal Sa in the normal state and the occurrence of the fixing failure by detecting whether the high level of the internal signal Pin switches to the low level again after the internal signal Pin switches from the low level to the high level. With this configuration, the level of the digital signal Sa can be determined with high accuracy, and the fixing failure occurred in the input circuit 5 can be detected. Further, the fixing failure can be detected with the single channel configuration. Thus, the multiple channel configuration, in which an input path of a single digital signal Sa is configured to have multiple channels can be avoided. Thus, with the present embodiment, the fixing failure of the input circuit 5 can be detected with a simple circuit structure.

In the above-described configuration, the determination unit 10 distinguishes and determines the high level of the digital signal Sa in the normal state and the occurrence of the fixing failure by detecting whether the high level of the internal signal Pin switches to the low level again after the internal signal Pin switches from the low level to the high level. That is, the determination unit 10 distinguishes and determines the high level of the digital signal Sa in the normal state and the occurrence of the fixing failure based on the rising edge and the falling edge of the internal signal Pin. This determination method may cause an erroneous determination as the following description.

When the fixing failure occurred in the input circuit 5 is a minor fixing failure in which a fixing state and a non-fixing state of the high level are repeated, the level of the internal signal Pin alternately switches between high and low similar to the level of the internal signal Pin output while the digital signal Sa is high level in the normal state. Therefore, with the determination method based on rising edge or falling edge of the internal signal Pin, the determination unit 10 may fail to detect the above-described minor fixing failure when the minor fixing failure is actually occurred. In addition, the determination is erroneously made that the digital signal Sa is high level.

With consideration of the above-described erroneous determination, the determination unit 10 according to the present embodiment determines the digital signal Sa has the high level when (i) the internal signal Pin switches from the low level to the high level and the high level continues for the first time period T1 which corresponds to a period while the clock signal Sb maintains the high level, and then (ii) the internal signal switches from the high level to the low level and the low level continues for the second time period T2 which corresponds to a period while the clock signal Sb maintains the low level. Also, the determination unit 10 according to the present embodiment determines the digital signal Sa has the high level when (i) the internal signal Pin switches from the high level to the low level and the low level continues for the second time period T2, and then (ii) the internal signal switches from the low level to the high level and the high level continues for the first time period T1.

When the digital signal Sa is high level in the normal state, the period while the internal signal Pin maintains high level is the same as the high level period of the clock signal Sb, and the period while the internal signal Pin maintains low level is the same as the low level period of the clock signal Sb. When the minor fixing failure occurs, the period while the internal signal Pin maintains high level may be substantially different from the high level period of the clock signal Sb, and the period while the internal signal Pin maintains low level may be substantially different from the low level period of the clock signal Sb. Thus, according to the determination method that considers each edge of the internal signal Pin together with the period while the internal signal Pin maintains the high level and the period while the internal signal Pin maintains the low level, the determination unit 10 can surely avoid an erroneous determination that determines the high level of the digital signal Sa when the above-described minor fixing failure occurs.

When the level of the internal signal Pin repeatedly switches within a period shorter than half cycle of the clock signal Sb, the determination unit 10 of the present embodiment executes the interpolation process that considers no level switch occurs in the internal signal Pin. Thus, when the internal signal Pin changes due to the influence of noise or the like, the determination unit 10 can ignore the change and determine that the internal signal Pin maintains the level determined before the change occurs by execution of the interpolation process. With this configuration, the determination unit 10 can perform the determination without being affected by noise or the like. Thus, the configuration according to the present embodiment can restrict a decrease in determination accuracy due to the noise or the like, and can prevent an erroneous determination.

The determination unit 10 stops the determination of the value of the digital signal Sa when the interpolation process is continuously executed for the predetermined set time period Tb. After stopping the determination of the value of the digital signal Sa, the determination unit 10 outputs, to the CPU module 3, a determination result indicating the same determination result in a case where the emergency stop switch 7 is operated. With this configuration, when the determination unit 10 fails to determine the level of the digital signal Sa for a relatively long period due to the influence of noise or the like, the CPU module 3 executes similar process to the process executed when the emergency stop switch 7 is operated. That is, the CPU module 3 executes the process for emergently stopping the operation of the control target 4. In the present embodiment, when the emergency stop switch 7 is operated during a period while the determination unit 10 cannot determine the level of the digital signal due to the influence of noise or the like, the CPU module 3 can emergently stop the operation of the control target 4 although the operation made to the control target 4 may fail to be detected. This configuration can surely maintain the safety.

The above-described set time period Tb is obtained by subtracting at least the necessary time period Td from the predetermined time period Tc. Herein, the predetermined time period Tc is set in advance as the upper limit of the time period from the operation of the emergency stop switch 7 to the actual operation stop of the control target 4. The necessary time period Td is a time period required for the CPU module 3 to execute the process for emergency stop of the control target 4. With this configuration, when the emergency stop switch 7 is operated when the interpolation process is started at first time, the operation of the control target 4 can be surely stopped until an elapse of the predetermined time period Tc from the time point when the emergency stop switch 7 is operated.

(Second Embodiment)

Figure 13:
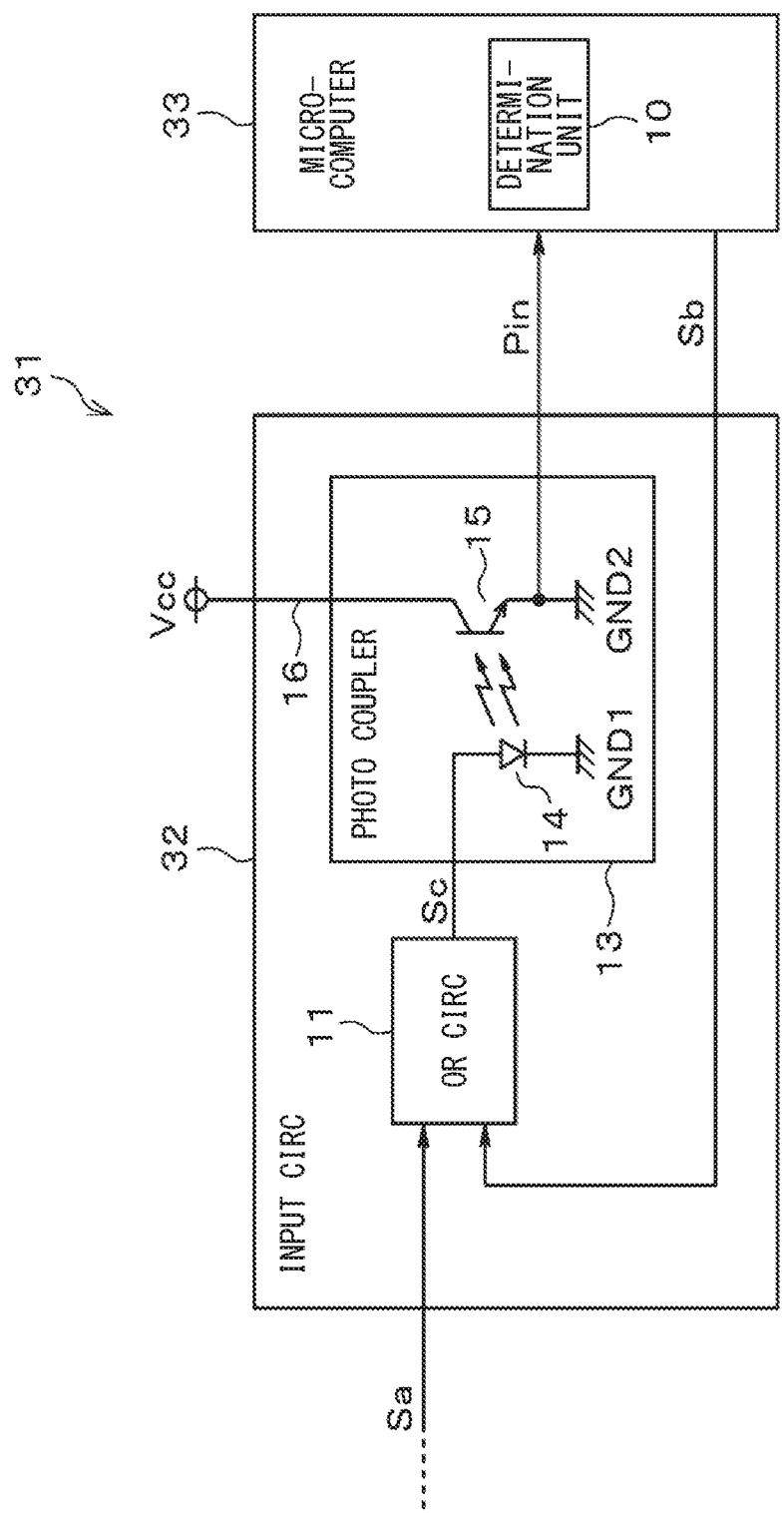
FIG. 13 is a diagram schematically showing a specific configuration example of an input module according to a second embodiment.

The following will describe a second embodiment in which a specific configuration of an input module is changed with respect to the first embodiment with reference to FIG. 13.

As shown in FIG. 13, an input circuit 32 of an input module 31 according to the present embodiment differs from the input circuit 5 of the first embodiment in that the oscillation circuit 12 is omitted.

A microcomputer 33 included in the input module 31 in the present embodiment is configured to generate the clock signal Sb similar to the oscillation circuit 12 in the first embodiment, in addition to the function of the microcomputer 6. The OR circuit 11 of the input circuit 32 receives the digital signal Sa and the clock signal Sb that is generated by the microcomputer 33, and outputs the logical sum signal Sc indicating the logical sum of the digital signal Sa and the clock signal Sb.

The internal signal Pin output from the input circuit 32 is similar to the internal signal Pin output from the input circuit 5 as described in the first embodiment. Therefore, the determination unit 10 of the microcomputer 33 according to the present embodiment can make determination based on the internal signal Pin given from the input circuit 32 similar to the determination unit 10 of the microcomputer 6 as described in the first embodiment. Thus, the same effect as the first embodiment can be achieved in the present embodiment.

Usually, a microcomputer includes an internal oscillation circuit. In the present embodiment, the microcomputer 33 can generate the clock signal Sb by using the internal oscillation circuit. Thus, with the configuration of the present embodiment, entire configuration of the input module 31 can be simplified since disposition of the oscillation circuit 12 is no more necessary in the input circuit 32.

(Other Embodiments)

The present disclosure is not limited to the embodiments that have been described above and illustrated in the drawings, but can arbitrarily be modified, combined, or expanded without departing from the gist of the present disclosure.

The numerical values and the like shown in the embodiments described above are examples, and are not limited to those examples.

The determination unit 10 may determine the level of the digital signal Sa or an occurrence of the fixing failure based on the rising edge and the falling edge of the internal signal Pin only. With this configuration, the determination unit 10 may fail to determine the above-described minor fixing failure. However, since the minor fixing failure rarely occurs, the determination unit 10 can determine the level of the digital signal Sa or an occurrence of the fixing failure in most of cases.

In each of the foregoing embodiments, the determination unit 10 determines that the digital signal Sa is high level when a first condition or a second condition is satisfied. Herein, the first condition is satisfied when the low level of the internal signal Pin switches to the high level, and then the high level of the internal signal Pin switches to the low level again. The second condition is satisfied when the high level of the internal signal Pin switches to the low level, and then the low level of the internal signal Pin switches to the high level again. Alternatively, the determination unit 10 may determine that the digital signal Sa is high level only when the first condition is satisfied. With this configuration, the determination unit 10 can also correctly distinguish and determine the high level of the digital signal Sa in the normal state and the occurrence of the fixing failure.

A specific configuration of the OR circuit 11 is not limited to the configuration described in the foregoing embodiments, and can be changed as appropriate. Under a condition that the OR circuit 11 is arranged in the input circuit 5, 32, a specific arrangement of the OR circuit 11 in the input circuit 5, 32 can be changed appropriately.

The signal output unit is not limited to the above-described photo coupler 13, and another device can be provided appropriately under a condition that the device is capable of outputting the same internal signal Pin as the photo coupler 13. For example, when the above-described electric insulation is not necessary, the signal output unit can be configured by only a switching element that turns on and off based on the logical sum signal Sc similarly to the phototransistor 15.

The present disclosure is described to be applied to the input module 2, 31 that inputs the digital signal Sa which has value changing according to the operation made to the emergency stop switch 7 for emergently stopping the operation of the control target 4. Further, the present disclosure may also be applied to an input module of an industrial control apparatus which inputs an external digital signal applied from an external source.

According to an aspect of the present disclosure, an input module of an industrial control apparatus includes: an input circuit to which a digital signal from an external source is input, the input circuit outputting a binary signal as an internal signal; and a determination unit determining a level of the digital signal based on the internal signal output from the input circuit, and the determination unit outputting a determination result of the digital signal to an external device. The input circuit includes: an OR circuit receiving the digital signal and a clock signal, the OR circuit outputting a logical sum signal indicating a logical sum of the digital signal and the clock signal, the clock signal having a binary level switching at a predetermined cycle; and a signal output unit including a switching element, a first main terminal of the switching element being connected with a first supply line that supplies a first voltage corresponding to a high level of the internal signal, a second main terminal of the switching element being connected with a second supply line that supplies a second voltage corresponding to a low level of the internal signal, the switching element is in an on state during a high level of the logical sum signal and is in an off state during a low level of the logical sum signal, the signal output unit outputting a signal obtained at the second main terminal of the switching element as the internal signal.

The determination unit: determines that the digital signal has a low level when the low level of the internal signal continues for a certain time period; determines that the digital signal has a high level when the internal signal switches from the low level to the high level and then switches to the low level again; and determines an occurrence of a fixing failure when the internal signal switches from the low level to the high level and then fails to switch to the low level again.

In the above-described configuration, the level of the internal signal output from the input circuit switches according to the value, that is, the level of the digital signal in the normal state. Herein, the normal state refers to a state in which no fixing failure, that is, the high fixing of the second main terminal of the switching element to the first power supply line caused by the short circuit occurs. In the normal state, during the low level of the digital signal, the logical sum signal has the low level, and thus, the switching element is in off state. Thus, the internal signal always has the low level. The determination unit determines that the digital signal is low level when the internal signal continuously maintains the low level at least for the certain time period. With this configuration, in the normal state, the determination unit is able to correctly determine the value of the digital signal based on the internal signal during the period while the digital signal Sa is low level.

In the normal state, while the digital signal is high level, the logical sum signal alternately switches the high level and the low level at the same cycle with the cycle of the clock signal. Thus, in the normal state, while the digital signal is high level, the switching element alternately turns on and turns off at the same cycle with the cycle of the clock signal. Thus, the level of the internal signal alternately switches between high and low at the same cycle with the cycle of the clock signal. The determination unit determines the digital signal is high level when the internal signal switches from the low level to the high level and then switches the low level again. Thus, in the normal state, the determination unit is able to correctly determine the value of the digital signal based on the internal signal during the high level of the digital signal Sa.

When the fixing failure occurs, the level of the internal signal output from the input circuit does not switch according to the level of the digital signal and always maintain the high level regardless of the level of the digital signal. The fixing failure occurs due to the high fixing of the second main terminal of the switching element in which the second main terminal of the switching element is short circuited to the first power supply line. The determination unit determines an occurrence of the fixing failure in the input circuit when the internal signal switches from the low level to the high level and then fails to switch to the low level again.

In the above-described configuration, the determination unit is able to distinguish and correctly determine the high level of the digital signal in the normal state and the occurrence of the fixing failure by detecting whether the high level of the internal signal switches to the low level again after the internal signal switches from the low level to the high level. With this configuration, the level of the digital signal can be determined with high accuracy, and the fixing failure occurred in the input circuit can be detected. Further, the fixing failure can be detected with the single channel configuration. Thus, the multiple channel configuration, in which an input path of a single digital signal is configured to have multiple channels can be avoided. Thus, with the above-described configuration, the fixing failure of the input circuit can be detected with a simple circuit structure.

In the above-described configuration, the determination unit distinguishes and determines the high level of the digital signal in the normal state and the occurrence of the fixing failure by detecting whether the high level of the internal signal switches to the low level again after the internal signal switches from the low level to the high level. In the determination method that distinguishes and determines the high level of the digital signal in the normal state and the occurrence of the fixing failure based on the rising edge and the falling edge of the internal signal may cause an erroneous determination as the following description.

When the fixing failure occurred in the input circuit is a minor fixing failure in which a fixing state and a non-fixing state of the high level are repeated, the level of the internal signal alternately switches between high and low similar to the level of the internal signal Pin output while the digital signal is high level in the normal state. Therefore, with the determination method based on rising edge or falling edge of the internal signal, the determination unit may fail to detect the above-described minor fixing failure when the minor fixing failure is actually occurred, and may made an erroneous determination that the digital signal is high level. In order to avoid the erroneous determination, the determination unit may execute the determination process as follows.

The determination unit may determine that the digital signal has the high level when (i) the internal signal switches from the low level to the high level and continues the high level for a first time period, and then (ii) the internal signal switches from the high level to the low level and continues the low level for a second time period. The first time period corresponds to a period in which the clock signal has a high level. The second time period corresponds to a period in which the clock signal has a low level.

When the digital signal is high level in the normal state, the period while the internal signal maintains high level is the same as the high level period of the clock signal, and the period while the internal signal maintains low level is the same as the low level period of the clock signal. When the minor fixing failure occurs, the period while the internal signal maintains high level may be substantially different from the high level period of the clock signal, and the period while the internal signal maintains low level may be substantially different from the low level period of the clock signal. Thus, according to the determination method that considers each edge of the internal signal together with the period while the internal signal maintains the high level and the period while the internal signal maintains the low level, the determination unit can surely avoid an erroneous determination that determines the high level of the digital signal when the above-described minor fixing failure occurs.

As described above, in the normal state, while the digital signal is high level, the internal signal alternately switches the high level and the low level at the same cycle with the cycle of the clock signal. Thus, the determination unit may determine that the digital signal has the high level when the internal signal switches from the high level to the low level and then switches to the high level again. With this configuration, in the normal state, the determination unit is able to correctly determine the value, that is, the level of the digital signal based on the internal signal during the high level of the digital signal.

The determination unit may determine that the digital signal has the high level when (i) the internal signal switches from the high level to the low level and continues the low level for a second time period, and then (ii) the internal signal switches from the low level to the high level and continues the high level for a first time period, According to such a determination method, it is possible to prevent the occurrence of an erroneous determination due to a minor fixing failure.

In the above configuration, the level of the internal signal in the normal state does not switch during half period (half cycle) of the clock signal Sb. When the level of the internal signal switches during a period shorter than half cycle of the clock signal, it is considered that the switching is due to an influence of noise or the like. When the determination unit accurately captures level switch in the internal signal due to the influence of noise or the like, and determines the level of the digital signal based on the level switch, the determination accuracy may be decreased or an erroneous determination may be made.

When a level of the internal signal repeatedly switches within a period shorter than a half cycle of the clock signal, the determination unit may execute an interpolation process and determine no level switch occurs in the internal signal. When the internal signal changes due to the influence of noise or the like, the determination unit can ignore the change and determine that the internal signal Pin maintains the level determined before the change occurs by execution of the interpolation process. With this configuration, the determination unit can perform the determination without being affected by noise or the like. Thus, this configuration can restrict a decrease in determination accuracy due to the noise or the like, and can prevent an erroneous determination.

The external device, which the determination result determined by the determination unit is output to, may be provided by a CPU module, the CPU module may control an operation of a control target and the control target may be configured to stop an operation in response to an activation of an emergency stop switch of the control target. The level of the digital signal may switch in response to the activation of the emergency stop switch of the control target. When the determination unit continuously executes the interpolation process for a set time period, the determination unit may stop a determination of the level of the digital signal and output, to the CPU module, a determination result same as a result in a case of the activation of the emergency stop switch. The input module provides the external CPU module with the determination result of the value of the digital signal. In this configuration, execution of the interpolation process with no restriction will cause the following difficulty.

When noise is continuously superimposed on the input module, the level of the internal signal may continuously switch due to the influence of noise. When the determination unit continuously executes the interpolation process, the determination unit fails to correctly determine the level of the digital signal for a relatively long period. Thus, the CPU module also fails to correctly determine the operation state, for example, an activation of the emergency stop switch. When the emergency stop switch is activated due to an abnormality occurred in the control target during the relatively long execution period of the interpolation process, the CPU module fails to detect the operation made to the control target and accordingly fails to emergently stop the control target.

The determination unit described in the above configuration may stop the determination of the value of the digital signal when the interpolation process is continuously executed for a predetermined set time period. That is, the determination unit may stop the determination of the value of the digital signal when a duration of the interpolation process reaches the set time period. After stopping the determination of the value of the digital signal, the determination unit may output, to the CPU module, determination result which is the same as in a case where the emergency stop switch is activated, as the determination result of the value of the signal. With this configuration, when the determination unit fails to determine the level of the digital signal for a relatively long period due to the influence of noise or the like, the CPU module executes a process similar to a process executed when the emergency stop switch is activated, That is, the CPU module executes a process for emergently stopping the operation of the control target. With this configuration, when the emergency stop switch is activated during a period while the determination unit cannot determine the level of the digital signal due to the influence of noise or the like, the CPU module can emergently stop the operation of the control target although the operation made to the control target may fail to be detected. This configuration can surely maintain the safety.

The set time period may be obtained by subtracting at least a necessary time period from a predetermined time period. The predetermined time period is preliminarily set as an upper limit of a time period from the activation of the emergency stop switch to an actual operation stop of the control target. The necessary time period is a time period required for the central processing unit module to execute a process for emergently stopping the control target With this configuration, when the emergency stop switch is activated after the interpolation process is started at first time, the operation of the control target can be surely stopped until an elapse of the predetermined time period from the time point when the emergency stop switch is activated.

According to another aspect of the present disclosure, an input module of an industrial control apparatus includes an input circuit and a microcomputer. A digital signal from an external source is input to the input circuit, and the input circuit outputs a binary signal as an internal signal. The microcomputer determines a level of the digital signal based on the internal signal output from the input circuit, and outputs a determination result of the digital signal to an external device. The input circuit includes an OR circuit and a photo coupler. The OR circuit receives the digital signal and a clock signal, and outputs a logical sum signal indicating a logical sum of the digital signal and the clock signal. The clock signal has a binary level switching at a predetermined cycle. The photo coupler includes a switching element, A first main terminal of the switching element is connected with a first supply line that supplies a first voltage corresponding to a high level of the internal signal, and a second main terminal of the switching element is connected with a second supply line that supplies a second voltage corresponding to a low level of the internal signal. The switching element is in an on state during a high level of the logical sum signal and is in an off state during a low level of the logical sum signal. The photo coupler outputs a signal obtained at the second main terminal of the switching element as the internal signal. The microcomputer determines that the digital signal has a low level when the low level of the internal signal continues for a certain time period, determines that the digital signal has a high level when the internal signal switches from the low level to the high level and then switches to the low level again, and determines an occurrence of a fixing failure when the internal signal switches from the low level to the high level and then fails to switch to the low level again.

What is claimed is:

1. An input module of an industrial control apparatus comprising:
   an input circuit to which a digital signal from an external source is input, the input circuit outputting a binary signal as an internal signal; and
   a determination unit determining a level of the digital signal based on the internal signal output from the input circuit, and the determination unit outputting a determination result of the digital signal to an external device, wherein
   the input circuit includes:
     an OR circuit receiving the digital signal and a clock signal, the OR circuit outputting a logical sum signal indicating a logical sum of the digital signal and the clock signal, the clock signal having a binary level switching at a predetermined cycle; and
     a signal output unit including a switching element, a first main terminal of the switching element being connected with a first supply line that supplies a first voltage corresponding to a high level of the internal signal, a second main terminal of the switching element being connected with a second supply line that supplies a second voltage corresponding to a low level of the internal signal, the switching element is in an on state during a high level of the logical sum signal and is in an off state during a low level of the logical sum signal, the signal output unit outputting a signal obtained at the second main terminal of the switching element as the internal signal, and
   the determination unit:
     determines that the digital signal has a low level when the low level of the internal signal continues for a certain time period;
     determines that the digital signal has a high level when the internal signal switches from the low level to the high level and then switches to the low level again; and
     determines an occurrence of a fixing failure when the internal signal switches from the low level to the high level and then fails to switch to the low level again.

2. The input module according to claim 1, wherein
   the determination unit determines that the digital signal has the high level when (i) the internal signal switches from the low level to the high level and continues the high level for a first time period, and then (ii) the internal signal switches from the high level to the low level and continues the low level for a second time period, the first time period corresponds to a period in which the clock signal has a high level, and the second time period corresponds to a period in which the clock signal has a low level.

3. The input module according to claim 1, wherein the determination unit determines that the digital signal has the high level when the internal signal switches from the high level to the low level and then switches to the high level again.

4. The input module according to claim 3, wherein the determination unit determines that the digital signal has the high level when (i) the internal signal switches from the high level to the low level and continues the low level for a second time period, and then (ii) the internal signal switches from the low level to the high level and continues the high level for a first time period, the first time period corresponds to a period in which the clock signal has a high level, and the second time period corresponds to a period in which the clock signal has a low level.

5. The input module according to claim 1, wherein, when a level of the internal signal repeatedly switches within a period shorter than a half cycle of the clock signal, the determination unit executes an interpolation process and determines that no level switch occurs in the internal signal.

6. The input module according to claim 5, wherein the external device, which the determination result determined by the determination unit is output to, is provided by a central processing unit module, the central processing unit module controls an operation of a control target and the control target is configured to stop an operation in response to an activation of an emergency stop switch of the control target, the level of the digital signal switches in response to the activation of the emergency stop switch of the control target, and, when the determination unit continuously executes the interpolation process for a set time period, the determination unit stops a determination of the level of the digital signal and outputs, to the central processing unit module, a determination result same as a result in a case of the activation of the emergency stop switch.

7. The input module according to claim 6, wherein the set time period is obtained by subtracting at least a necessary time period from a predetermined time period, the predetermined time period is preliminarily set as an upper limit of a time period from the activation of the emergency stop switch to an actual operation stop of the control target, and the necessary time period is a time period required for the central processing unit module to execute a process for emergently stopping the control target.

8. An input module of an industrial control apparatus comprising:

an input circuit to which a digital signal from an external source is input, the input circuit outputting a binary signal as an internal signal; and a microcomputer determining a level of the digital signal based on the internal signal output from the input circuit, and the microcomputer outputting a determination result of the digital signal to an external device, wherein the input circuit includes:

an OR circuit receiving the digital signal and a clock signal, the OR circuit outputting a logical sum signal indicating a logical sum of the digital signal and the clock signal, the clock signal having a binary level switching at a predetermined cycle; and a photo coupler including a switching element, a first main terminal of the switching element being connected with a first supply line that supplies a first voltage corresponding to a high level of the internal signal, a second main terminal of the switching element being connected with a second supply line that supplies a second voltage corresponding to a low level of the internal signal, the switching element is in an on state during a high level of the logical sum signal and is in an off state during a low level of the logical sum signal, the photo coupler outputting a signal obtained at the second main terminal of the switching element as the internal signal, and the microcomputer:

determines that the digital signal has a low level when the low level of the internal signal continues for a certain time period;

determines that the digital signal has a high level when the internal signal switches from the low level to the high level and then switches to the low level again; and determines an occurrence of a fixing failure when the internal signal switches from the low level to the high level and then fails to switch to the low level again.

* * * * *